United States Patent
Wright et al.

(10) Patent No.: US 9,304,587 B2
(45) Date of Patent: Apr. 5, 2016

(54) FORCE SENSING MOUSE

(71) Applicant: Apple Inc., Cupertino, CA (US)

(72) Inventors: James E. Wright, San Jose, CA (US); Keith J. Hendren, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 13/766,736

(22) Filed: Feb. 13, 2013

(65) Prior Publication Data

US 2014/0225832 A1 Aug. 14, 2014

(51) Int. Cl.
| | |
|---|---|
| G06F 3/01 | (2006.01) |
| G06F 3/041 | (2006.01) |
| G06F 3/0354 | (2013.01) |
| G06F 3/0338 | (2013.01) |

(52) U.S. Cl.
CPC .............. *G06F 3/016* (2013.01); *G06F 3/0338* (2013.01); *G06F 3/03543* (2013.01); *G06F 3/03547* (2013.01); *G06F 3/0414* (2013.01); *G06F 2203/015* (2013.01); *G06F 2203/04105* (2013.01)

(58) Field of Classification Search
CPC ....... G06F 3/041; G06F 3/0414; G06F 3/044; G06F 2203/015; G06F 2203/04106; G06F 2203/04105; G06F 3/03–3/0395; G06F 3/016; G06F 3/03543; G06F 3/0338; G06F 3/03547; G06F 3/033; G06F 3/03541
See application file for complete search history.

(56) References Cited

U.S. PATENT DOCUMENTS

| | | | |
|---|---|---|---|
| 4,577,174 A | 3/1986 | Lemmer | |
| 5,541,372 A | 7/1996 | Baller et al. | |
| 6,100,874 A * | 8/2000 | Schena et al. | 345/157 |
| 6,337,678 B1 | 1/2002 | Fish | |
| 6,388,655 B1 * | 5/2002 | Leung | 345/157 |
| 6,518,954 B1 * | 2/2003 | Chen | 345/161 |
| 7,176,897 B2 | 2/2007 | Roberts | |
| 7,283,120 B2 | 10/2007 | Grant | |
| 7,525,532 B2 | 4/2009 | Liu et al. | |
| 7,639,232 B2 | 12/2009 | Grant et al. | |

(Continued)

FOREIGN PATENT DOCUMENTS

| | | |
|---|---|---|
| DE | 102010007486 | 8/2011 |
| EP | 2077490 | 7/2009 |

(Continued)

OTHER PUBLICATIONS

U.S. Appl. No. 13/559,577, filed Jul. 26, 2012, Parivar et al.

(Continued)

*Primary Examiner* — Dwayne Bost
*Assistant Examiner* — Ivelisse Martinez Quiles
(74) *Attorney, Agent, or Firm* — Brownstein Hyatt Farber Schreck, LLP

(57) ABSTRACT

A force sensing input device (such as a force sensing mouse) includes at least one force sensor and at least one top portion movably connected to at least one bottom portion. When a force is applied to the top portion, the top portion exerts pressure on the force sensor. The force sensor obtains force data based upon the pressure. The amount of force applied to the top portion, within a range of force amounts, is determined from at least the force data. In this way, a broader range of inputs may be receivable from the force sensing input device as compared to input devices that merely detect whether or not a button or similar element has been pushed.

20 Claims, 6 Drawing Sheets

(56) References Cited

U.S. PATENT DOCUMENTS

| | | | |
|---|---|---|---|
| 7,685,538 B2 | 3/2010 | Fleck et al. | |
| 7,825,903 B2 | 11/2010 | Anastas et al. | |
| 7,952,566 B2 * | 5/2011 | Poupyrev et al. | 345/173 |
| 8,081,156 B2 | 12/2011 | Ruettiger | |
| 8,084,968 B2 | 12/2011 | Murray et al. | |
| 8,169,401 B2 | 5/2012 | Hardwick | |
| 8,260,337 B2 | 9/2012 | Periyalwar et al. | |
| 8,264,465 B2 | 9/2012 | Grant et al. | |
| 8,279,175 B2 | 10/2012 | Kim et al. | |
| 8,296,670 B2 | 10/2012 | Matthews et al. | |
| 8,310,350 B2 | 11/2012 | Pfau et al. | |
| 8,310,452 B2 | 11/2012 | Takenaka et al. | |
| 8,421,567 B2 | 4/2013 | Eckl et al. | |
| 8,487,759 B2 | 7/2013 | Hill | |
| 8,502,547 B2 | 8/2013 | Philipp | |
| 8,536,978 B2 * | 9/2013 | Coggill | 340/5.54 |
| 8,633,901 B2 | 1/2014 | Orr et al. | |
| 8,633,916 B2 | 1/2014 | Bernstein et al. | |
| 2004/0080494 A1 | 4/2004 | Fahlman | |
| 2006/0274042 A1 * | 12/2006 | Krah et al. | 345/163 |
| 2007/0152966 A1 * | 7/2007 | Krah et al. | 345/163 |
| 2008/0068343 A1 | 3/2008 | Hoshino et al. | |
| 2008/0084384 A1 | 4/2008 | Gregorio et al. | |
| 2008/0165159 A1 * | 7/2008 | Soss et al. | 345/174 |
| 2008/0297478 A1 * | 12/2008 | Hotelling et al. | 345/163 |
| 2009/0174672 A1 | 7/2009 | Schmidt | |
| 2009/0225046 A1 | 9/2009 | Kim | |
| 2009/0243817 A1 | 10/2009 | Son | |
| 2009/0316380 A1 | 12/2009 | Armstrong | |
| 2010/0053116 A1 * | 3/2010 | Daverman et al. | 345/175 |
| 2010/0149111 A1 | 6/2010 | Olien | |
| 2010/0164959 A1 | 7/2010 | Brown et al. | |
| 2010/0182263 A1 | 7/2010 | Aunio et al. | |
| 2010/0245246 A1 * | 9/2010 | Rosenfeld et al. | 345/163 |
| 2010/0328229 A1 | 12/2010 | Weber | |
| 2011/0163985 A1 | 7/2011 | Bae et al. | |
| 2011/0205163 A1 | 8/2011 | Hinckley et al. | |
| 2012/0013531 A1 | 1/2012 | Wilson | |
| 2012/0038568 A1 | 2/2012 | Colloms et al. | |
| 2012/0050230 A1 | 3/2012 | Harris | |
| 2012/0105358 A1 | 5/2012 | Momeyer et al. | |
| 2012/0249462 A1 | 10/2012 | Flanagan et al. | |
| 2013/0038541 A1 | 2/2013 | Bakker | |
| 2013/0093685 A1 | 4/2013 | Kalu et al. | |
| 2013/0154948 A1 * | 6/2013 | Schediwy et al. | 345/173 |

FOREIGN PATENT DOCUMENTS

| | | |
|---|---|---|
| EP | 2202619 | 6/2010 |
| EP | 2357547 | 8/2011 |
| EP | 2375306 | 10/2011 |
| EP | 2381340 | 10/2011 |
| EP | 2395414 | 12/2011 |
| JP | 2007034991 | 2/2007 |

OTHER PUBLICATIONS

"Immersion Announces MOTIV™ Development Platform for Android," retrieved from the Internet: URL:http://ir.immersion.com/releasedetail.cfm?sh_email=no&releaseid=549080, Feb. 10, 2011.

Zordan, Enrico et al., "Principle design and actuation of a dual chamber electromagnetic micropump with coaxial cantilever valves," Biomedical Microdevices, Kluwer Academic Publishers, BO, vol. 12, No. 1, Oct. 17, 2009, pp. 55-62.

* cited by examiner

FORCE SENSING MOUSE

TECHNICAL FIELD

This disclosure relates generally to input devices, and more specifically to an input device that obtains force data related to a force applied to the input device wherein an amount of the force may be determined from the force data.

BACKGROUND

Electronic devices, such as computing devices, are often utilized with one or more input mechanisms. For example, a mouse is typically an input device that can generally be manipulated by a user to provide directional input to an associated electronic device. In some cases, such a mouse may include one or more selection elements to which a user can apply force in order to indicate a selection. However, such selection elements are generally binary-they are activated, or they are not. That is, the selection elements typically only detect whether or not a force exceeding a particular threshold has been applied and cannot determine the actual amount of force that has been applied within a range of force amounts.

SUMMARY

The present disclosure discloses systems and methods for providing force sensing input devices. A force sensing input device (such as a force sensing mouse) may include at least one force sensor and at least one top portion movably connected (such as pivotally and/or otherwise rotatably connected via one or more pivot, one or more ball joint elements, and/or other such pivotal connection elements) to at least one bottom portion. When a force is applied to the top portion, the top portion may exert pressure on the force sensor. The force sensor may obtain force data based upon the pressure. The amount of force applied to the top portion, within a range of force amounts, may be determined from at least the force data (such as by the force sensing input device or by an electronic device to which the force sensing input device transmits the force data).

In this way, a broader range of inputs may be receivable from the force sensing input device as compared to input devices that merely detect whether or not a button or similar element has been pushed.

In some implementations, the force data and/or the determined amount of force may be scaled based on a detected location where the force is applied. In some cases of such implementations, the top portion may be a touch sensitive surface, such as a capacitive touch sensitive surface, that determines a location where the top of the force sensing input device is touched. In such cases, the location determined by the touch sensitive surface may be utilized as the detected location in order to scale the force data and/or the determined amount of force.

In other cases, the force sensing input device may include multiple force sensors. In such other cases, the detected location may be determined by comparing and/or combining force data from the multiple force sensors.

In various implementations, the force sensor may be one or more force sensors of various kinds. In some cases, such a force sensor may include one or more cantilever beams. Such cantilever beams may include one or more strain gauges.

In one or more implementations, the force sensing input device may include one or more feedback components. Such feedback components may include one or more auditory feedback devices, one or more haptic feedback devices that include solenoids and/or other mechanisms for vibrating any portion of the force sensing input device, one or more haptic feedback devices that cause objects to strike any portion of the force sensing input device, and/or any other kind of feedback component. Such feedback components may be configured to provide varying intensities of feedback in response to various inputs, statuses of associated electronic devices, and so on.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and computer program products that embody various elements of the present disclosure. However, it should be understood that the described disclosure may be practiced in a variety of forms in addition to those described herein.

The present disclosure discusses systems that may take the form of, and methods for providing and/or operating, force sensing input devices. A force sensing input device (such as a force sensing mouse) may include at least one force sensor and at least one top portion movably connected (such as pivotally and/or otherwise rotatably connected via one or more pivots, one or more ball joint elements, and/or other such pivotal connection elements) to at least one bottom portion. When a force is applied to the top portion, the top portion may exert pressure on the force sensor by moving with respect to the bottom portion. The force sensor may obtain force data based upon the pressure. The amount of force applied to the top portion, within a range of force amounts, may be determined from at least the force data (such as by the force sensing input device or by an electronic device to which the force sensing input device transmits the force data). In this way, a broader range of inputs may be generated by the force sensing input device as compared to input devices that operate in a binary mode.

Figure 1A:
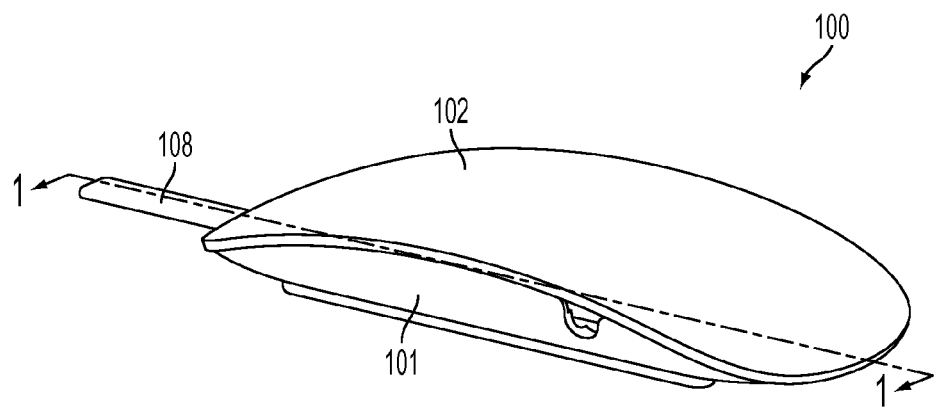
FIG. 1A is an isometric view of a first implementation of a force sensing mouse.

FIG. 1A is an isometric view of a first implementation of a force sensing mouse 100. Although the force sensing mouse is described as a mouse, it is understood that in other implementations an input device other than a mouse, such as a track ball, joystick, touch-sensitive surface, track pad, and so on, may be utilized without departing from the scope of the present disclosure. As illustrated, the force sensing mouse may include a top portion 102 and a bottom portion 101.

The force sensing mouse 100 is also shown as including a mouse cord 108 for communicating with an associated electronic device. However, it is understood that this is for the purposes of example and the force sensing mouse may not include a cord in various implementations, and/or may communicate with an associated electronic device utilizing various wireless communication methods such as WiFi, Bluetooth, and so on.

Figure 1B:
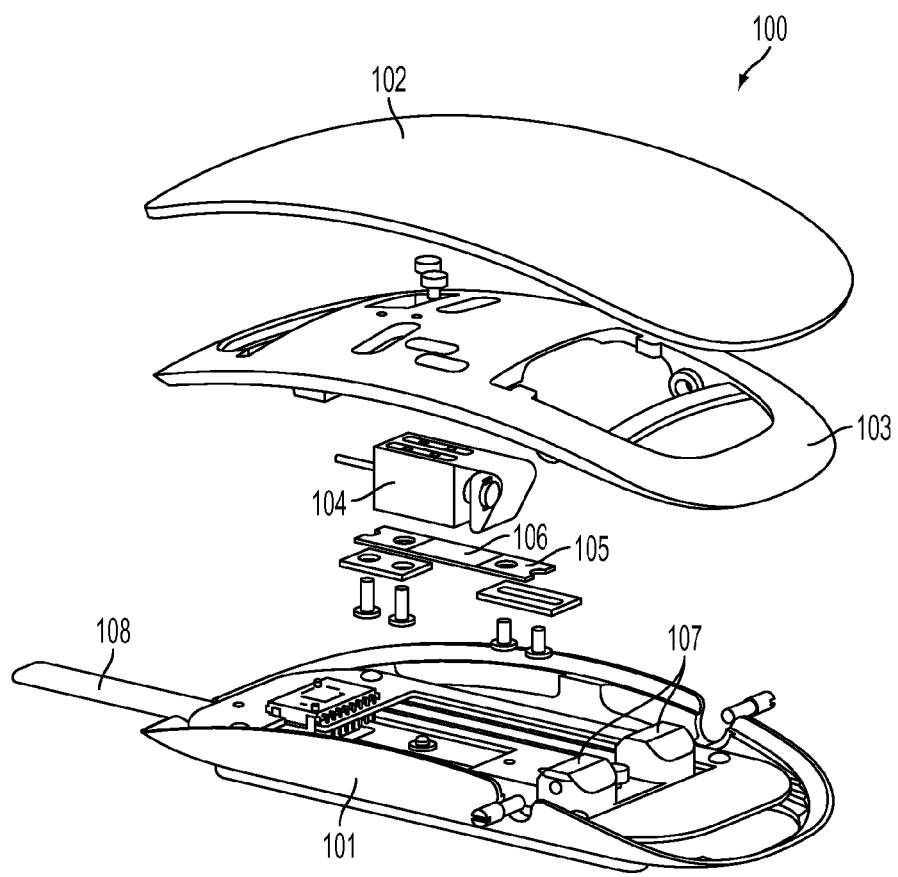
FIG. 1B is an exploded isometric view of the force sensing mouse of FIG. 1A.

FIG. 1B is an exploded isometric view of the force sensing mouse 100. As illustrated, the top portion 102 may be attached to a shell 103 which may in turn be pivotally attached to the bottom portion 101 via pivot elements 107. The top portion 102 may be further secured or fastened to the bottom portion 101 at other attachment points, thereby securing the two portions together and preventing over-pivoting of the top with respect to the bottom. Such additional attachment points may constrain motion of the top portion 102 about the pivot elements 107, but generally do not completely prevent such motion. As also illustrated, the force sensing mouse may also include cantilever beam 105, which may include a strain gauge 106, coupled to the bottom portion and/or the top portion. Moreover, the force sensing mouse may include a feedback element 104.

As shown in FIG. 1B, the cantilever beam 105 may be fixedly attached on a first side and movably attached on a second side. In this way, the cantilever beam is cantilever and may be strained by force exerted by the top portion 102. However, it is understood that this configuration is for the purposes of example. Other configurations are possible without departing from the scope of the present disclosure, such as configurations where one side of the cantilever beam is fixedly attached and the other side of the cantilever beam is left unattached.

Figure 1C:
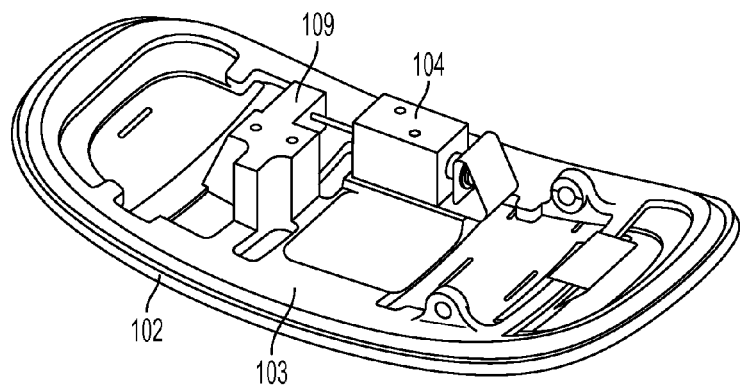
FIG. 1C is an upside down isometric view of the top portion of the force sensing mouse of FIG. 1A.
Figure 1D:
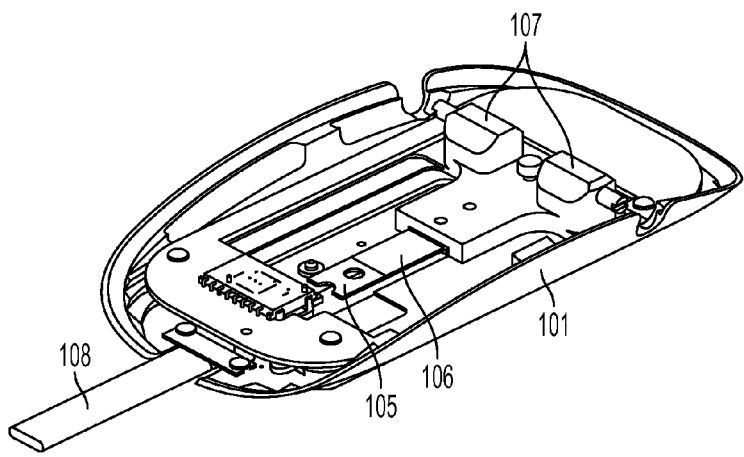
FIG. 1D is an isometric view of the bottom portion of the force sensing mouse of FIG. 1A.
Figure 1E:
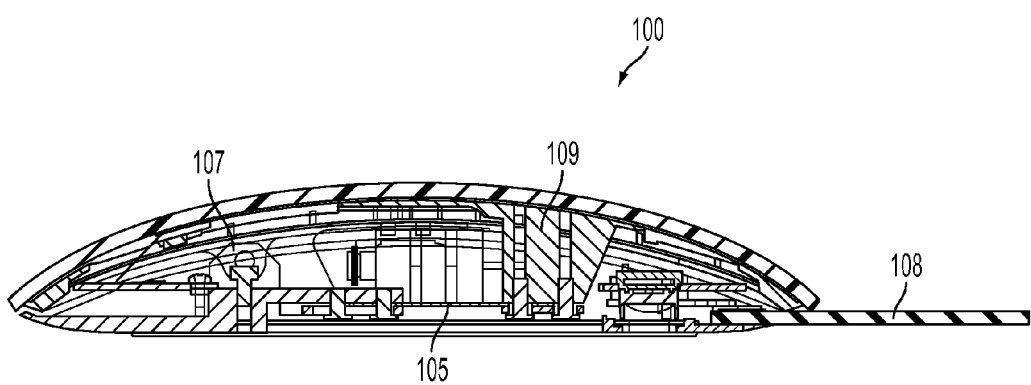
FIG. 1E is a cross-sectional view of the force sensing mouse of FIG. 1A taken along the line 1-1 of FIG. 1A.

FIG. 1C is an upside down isometric view of the top portion 102 and FIG. 1d is an isometric view of the bottom portion 101. As illustrated in FIG. 1C, the top portion includes a pressure element 109 that is operable to exert pressure on the cantilever beam 105 when force is applied to the top portion. This can also be seen in FIG. 1E, which is a cross-sectional view of the force sensing mouse 100 taken along the line 1-1 of FIG. 1A.

When a force is applied to the top portion 102, the pressure element 109 may exert pressure on the cantilever beam 105. This pressure may transfer the force applied to the top portion 101 to the cantilever beam and may cause the cantilever beam to strain, twist, flex, and/or otherwise alter its configuration. This, in turn, bends or otherwise deforms the strain gauge 106 that is affixed to the cantilever beam 105. As the strain gauge deforms, it outputs a voltage. The greater the deformation, the higher the output voltage of the gauge 106. This output voltage may be transmitted to a processor (not shown) either within the mouse 100 or in a computing device associated with the mouse. The processor may use the gauge output to estimate the force applied to the top portion, thereby generating force data. From this force data, an amount of the force that is exerted on the top portion within a range of force amounts (such as between 0.001 pounds and 2 pounds of force) may be determined. In some embodiments, a look-up table may be implemented to correlate outputs of the strain gauge 106 to forces exerted on the top portion 102.

As the top portion 102 is pivotally attached to the bottom portion 101 through the pivot elements 107, the force transferred to the cantilever beam 105 may differ depending on the location of the top portion where the force is applied, even when the same amount of force is applied to the top portion in each case. For example, less force may be transferred to the cantilever beam 105 when the force is applied at the end of the force sensing mouse 100 corresponding to the mouse cord 108 as this location is further from the pivot elements 107. To the contrary, more force may be transferred to the cantilever beam 105 when the force is applied at the directly above the pivot elements 107. To correct for this distortion, the force data may be scaled based on the location where the force is applied.

For example, in some implementations, the top portion 102 may be a touch sensitive surface, such as a capacitive touch sensitive surface. The touch sensitive surface may be able to detect one or more user touches which may be interpreted as input, gestures (based on detected combinations of one or more sensed touches, movement of one or more touches on the touch sensitive surface, and so on), and so on. As such, the exact location that a force is applied may be determinable utilizing the touch sensitive surface. This determined location may be utilized to scale the force data when determining the amount of force utilizing the force data. However, in other implementations, mechanisms other than touch sensing may be used to determine a location of an applied force. In some cases, the location of the applied force may be determinable from the force data itself, which will be discussed in more detail below.

Although the force sensing mouse 100 has been illustrated and described as utilizing a cantilever beam 105 with a strain gauge 106 to obtain the force data, it is understood that this is for the purposes of example. In other implementations, other force sensors may be utilized instead of a cantilever beam and/or strain gauge. Such force sensors may include one or more piezoelectric force sensors, force transducers, pressure sensor arrays, torque sensors, and/or any other kind of force sensor. As yet another example, an underside (or portion of an underside) of the top portion 102 may be formed from, or adjacent, a first conductive element such as a plate. A second conductive element and/or plate may be positioned within the body of the mouse 100, such as approximately at the location of the strain gauge 106 as shown in FIG. 1A. As the top portion moves downward in response to a user-generated force, the first conductive element may approach the second conductive element. The change in capacitance between these two conductive elements may be measured; the capacitance generally increases due to the separation distance decreasing. If the pivot is spring-loaded such that the force required to depress the top portion 102 increases with motion of the top portion, then the change in capacitance may be used to estimate an input force.

In some implementations, the force sensing mouse 100 may determine the amount of the force from the force data. In such cases, the force sensing mouse may include one or more processing units (not shown, but collectively referred to as a "processor") and/or other circuitry for determining the amount of the force form the force data. However, in other implementations, the force sensing mouse may transmit the force data to an electronic device (such as a computing device) with which the force sensing mouse is associated (possibly along with other data) and the electronic device may determine the amount of force from the transmitted force data.

As discussed above with respect to FIG. 1B, the force sensing mouse 100 may include one or more feedback elements 104. As illustrated, the feedback element 104 is a haptic feedback element that utilizes an electromagnet to provide haptic feedback by causing a magnetic element to strike the top portion 102. An electromagnet may be selectively actuated to move the feedback element 104 to strike the top portion 102 when haptic output is desired. However, it is understood that this is for the purposes of example. In various implementations, various kinds of feedback devices may be utilized (such as auditory feedback devices, haptic feedback devices that include solenoids and/or other mechanisms for vibrating any portion of the force sensing mouse, haptic feedback devices that cause objects to strike any portion of the force sensing mouse, and so on) that may be configured to provide varying intensities of feedback in response to various inputs, statuses of associated electronic devices, and so on. Likewise, it should be appreciated that haptic output may be provided on any surface of the mouse by varying the position and/or alignment of the feedback element 104.

For instance, a first amount of force may correspond to selection of an icon presented by a graphical interface by an associated electronic device whereas a second amount of force may correspond to execution of a program corresponding to the icon. When the force sensing mouse 100 detects the first amount of force, the force sensing mouse may utilize the feedback element 104 to provide a first level of feedback (such as striking the top portion 102 with a first amount of force) to indicate to a user that an input corresponding to selection of an icon was received. Similarly, when the force sensing mouse detects the second amount of force, the force sensing mouse may utilize the feedback element 104 to provide a second level of feedback that is more intense than the first level of feedback (such striking the top portion 102 with a second amount of force that is stronger than the first amount of force) to indicate to a user that an input corresponding to execution of a program corresponding to an icon was received.

Although the force sensing mouse 100 has been illustrated and described as having a top portion 102 movably connected to a bottom portion, it is understood that this is for the purposes of example. In various implementations the two portions may be portions other than top and bottom portions such as front portions, back portions, side portions, and so on. Though the portions are described with reference to directional terms, the portions are not limited to such directional terms and portions without such directional orientation may be utilized without departing from the scope of the present disclosure.

Figure 2:
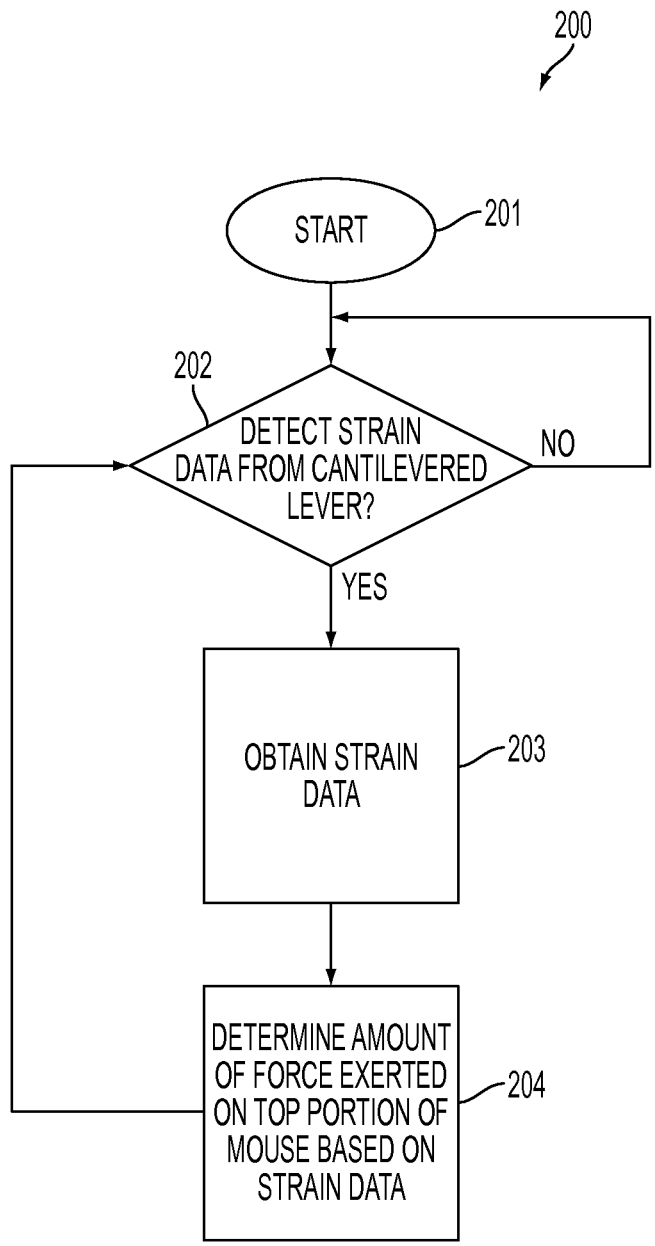
FIG. 2 is a flow chart illustrating a method for determining an amount of force applied to a force sensing input device. This method may be performed utilizing the force sensing mouse of FIG. 1A.

FIG. 2 illustrates a method 200 for operating a force sensing input device. The method 200 may be performed by the force sensing mouse of FIGS. 1A-1E. The flow begins at block 201 and proceeds to block 202 where the force sensing input device determines whether or not strain data from one or more cantilever beams corresponding to a force applied to a top portion of the force sensing input device is detected. If so, the flow proceeds to block 203. Otherwise, the flow returns to block 202 where the force sensing input device determines whether or not strain data from one or more cantilever beams is detected.

At block 203, the force sensing input device (or an associated computing device/processor) obtains strain data utilizing the cantilever beam. The flow then proceeds to block 204 where the force sensing input device determines an amount of force that was applied to a top portion of the force sensing input device based at least on the strain data.

The flow then returns to block 202 where the force sensing input device determines whether or not strain data from one or more cantilever beams is detected.

Although the method 200 has been illustrated and described as utilizing a cantilever beam to obtain strain data, it is understood that this is for the purposes of example. In other implementations, other force sensors may be utilized instead of a cantilever beam which may obtain force data, strain data, and/or any other data from which an amount of applied force may be determined.

Further, although the method 200 has been illustrated and described as the force sensing input device determining the amount of force, it is understood that this is for the purposes of example. In other implementations, the force sensing input device may transmit strain and/or force data to an electronic device (such as a computing device and/or other electronic device) with which the force sensing mouse is associated (possibly along with other data such as a determined location of an applied force detected by a touch sensitive surface and/or other force application location detection mechanism) and the electronic device may determine the amount of force from the transmitted force data.

Returning to FIG. 1, in some implementations, cantilever beam 105 and/or the strain gauge 106 may be operable to determine information regarding the location of an applied force. For example, the pivot elements 107 may allow side to side motion along with up and down motion and the strain gauge may be able to detect torsion of the cantilever beam caused by the force being applied to one side of the top portion or the other.

In other implementations, the force sensing mouse may include multiple cantilever beams and/or strain gauges, multiple force sensors of various kinds, and/or a combination of these elements. In such cases, force data may be obtained from multiple different force sensors and may be combined and/or compared in other to determine location of an applied force as well as the amount of the applied force. The location of the applied force may be utilized to scale the force data and/or the determined amount of force.

Figure 3A:
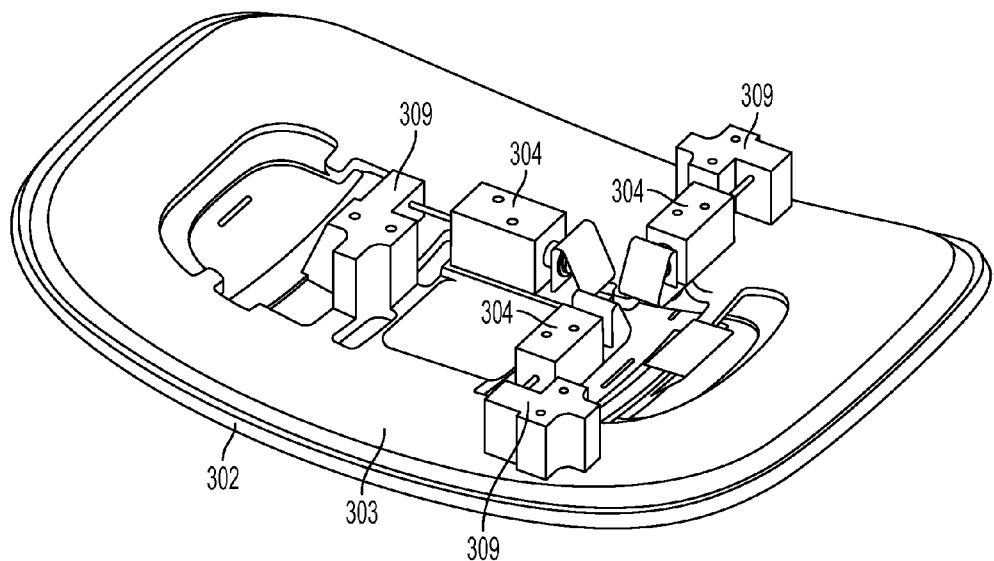
FIG. 3A is an upside down isometric view of a top portion of a second implementation of a force sensing mouse.
Figure 3B:
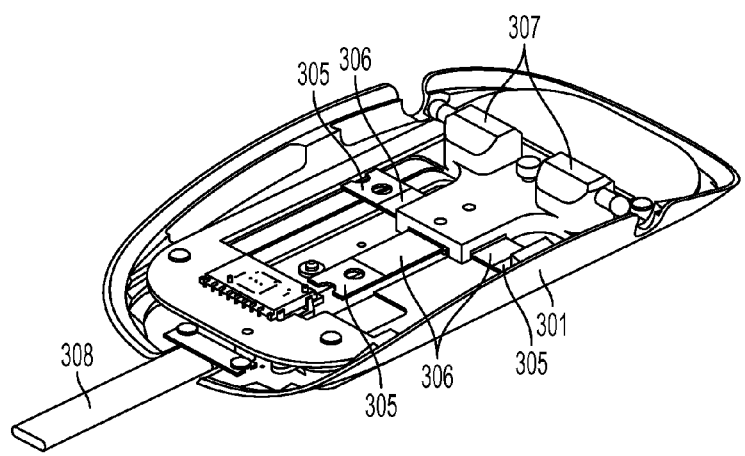
FIG. 3B is an isometric view of a bottom portion of the force sensing mouse of FIG. 3A.

By way of a first example, FIG. 3A illustrates a top portion 302 and FIG. 3B illustrates a bottom portion 301 of a second implementation of a force sensing mouse. As illustrated, the force sensing mouse includes a first cantilever beam 305 with a strain gauge 306 and two additional cantilever beams 305 with strain gauges 306 that are positioned orthogonally to the first (the force sensing mouse is also illustrated as including mouse cord 308, shell 303, pressure elements 309, and feedback elements 304). By combining and/or comparing force data from the three strain gauges 306, a determination may be made as to whether a force was applied to a left portion of the force sensing mouse, a right portion of the force sensing mouse, a middle portion of the force sensing mouse, and/or a combination thereof.

Figure 4A:
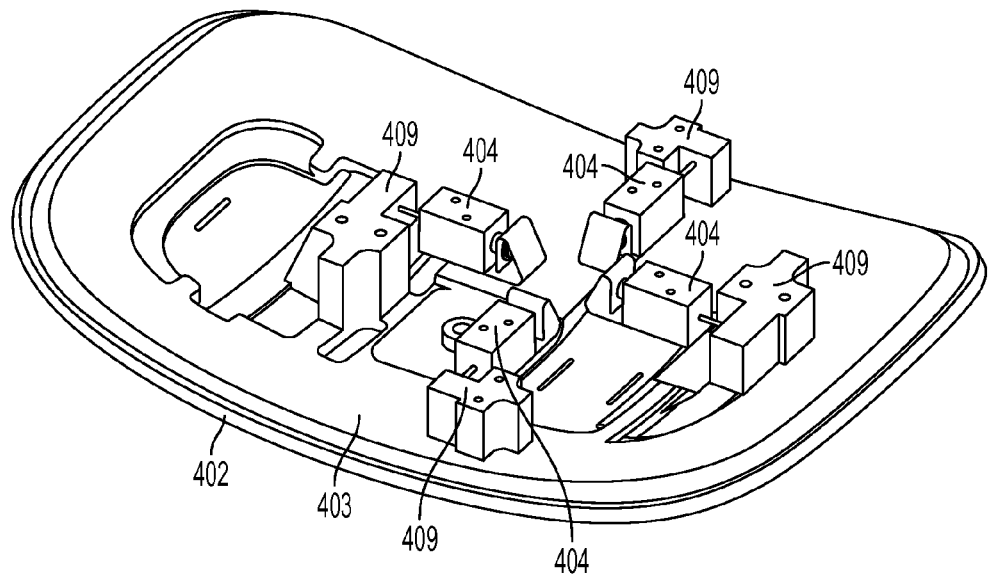
FIG. 4A is an upside down isometric view of a top portion of a second implementation of a force sensing mouse.
Figure 4B:
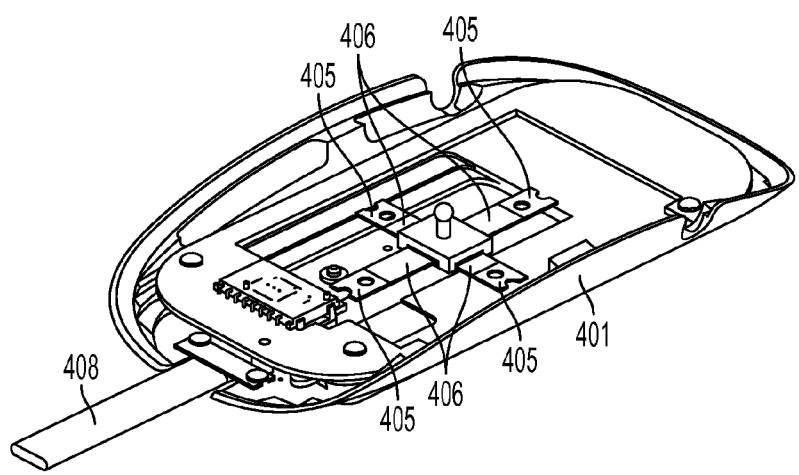
FIG. 4B is an isometric view of a bottom portion of the force sensing mouse of FIG. 3A.

By way of a second example, FIG. 4A illustrates a top portion 402 and FIG. 4B illustrates a bottom portion 401 of a third implementation of a force sensing mouse. As illustrated, the force sensing mouse includes four cantilever beams 405 with a strain gauges 406 that are positioned radially about a ball joint. The force sensing mouse is also illustrated as including mouse cord 408, shell 403, and feedback elements 404.

In this example, the top portion may be rotatable with respect to the bottom portion about the ball joint in one or more different directions. Such rotation may cause one or more of the pressure elements 409 to exert pressure on one or more of the cantilever beams 405, which may be detected by one or more of the strain gauges 406. By combining and/or comparing force data from the four strain gauges (in some cases force data from one or more of the four strain gauges may be no force data detected), a determination may be made as to whether a force was applied to a front portion of the force sensing mouse, a back portion of the force sensing mouse, a left side of the force sensing mouse, a right side of the force sensing mouse, a middle of the force sensing mouse, and/or a combination thereof.

Figure 5:
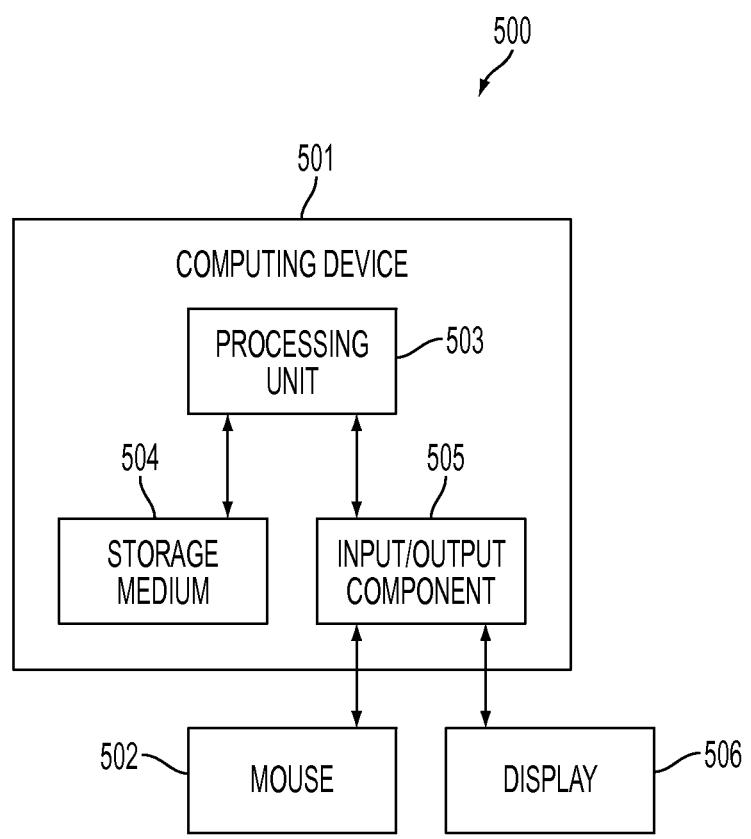
FIG. 5 is a block diagram illustrating a system for interacting with a force sensing input device. The force sensing input device may be one or more of the force sensing mice of FIGS. 1A-4B.

FIG. 5 is a block diagram illustrating a system 500 for interacting with a force sensing input device 502. The force sensing input device 502 may be one or more of the force sensing mice of FIGS. 1A-4B. As illustrated, the system may include a computing device 501 which may utilize one or more processing unit 503 to execute instructions stored in one or more storage media 504 to perform various computing device functions. The computing device may also include one or more input/output components 505 for receiving input (such as from the force sensing input device 502) and/or providing output (such as to the display 506 and/or the force sensing input device).

The computing device 501 may be any kind of computing device such as a desktop computer, a laptop computer, a tablet computer, a mobile computer, a digital video player, a digital music player, a smart phone, a cellular phone, a personal digital assistant, and/or other such computing device.

In various cases, the computing device 501 may receive force data related to application of a force to the top portion of the force sensing input device 502 and/or an amount of force applied to a top portion of the force sensing input device and/or other data (such as a location of the top portion of force sensing input device. The computing device may utilize such data in a variety of different ways.

For example, in cases where the force data is received, the computing device may determine that amount of force that was applied. The amount of force may correspond to various aspects of one or more programs executing on the computing device and the computing device may alter its status accordingly. For instance, a first amount of force may correspond to selection of an icon presented by a graphical interface whereas a second amount of force may correspond to execution of a program corresponding to the icon.

By way of another example, in cases where the amount of force is received, the amount of force may correspond to various aspects of one or more programs executing on the computing device and the computing device may alter its status accordingly as described with respect to the example above. For instance, the amount of force may correspond to a height that a character in a video game is instructed to jump.

By way of a third example, in cases where an amount of force is received along with a location where the force was applied, the location may correspond to locations on a graphical interface and the amount of force may correspond to an action to be performed at that location (such as a first amount of force may correspond to selection of an icon corresponding to the location of the graphical interface whereas a second amount of force may correspond to execution of a program corresponding to the icon).

By way of a fourth example, in cases where an amount of force is received along with an indication as to whether that force is a left force, a right force, or a middle force, the amount and kind of force may correspond to instructions for an aircraft in a flight simulator executing on the computing device. The kind of force (left, right, or middle) may correspond to the type of directional change that the aircraft is to make (pitch, yaw, or roll, respectively). Similarly, the amount of force may correspond to the speed at which the aircraft is to make the directional change.

By way of a fifth example, the computing device 501 may instruct one or more feedback components of the force sensing input device 502 to provide feedback based on the force data and/or an amount of force received by the computing device.

For instance, a first amount of force may correspond to selection of an icon presented by a graphical interface whereas a second amount of force may correspond to execution of a program corresponding to the icon. When the computing device receives force data and/or an amount of force that corresponds to the first amount of force, the computing device may instruct the feedback component to provide a first level of feedback (such as vibrating a solenoid with a first level of vibration) to indicate to a user that an input corresponding to selection of an icon was received.

Similarly, when the computing device receives force data and/or an amount of force that corresponds to the second amount of force, the computing device may instruct the feedback component to provide a second level of feedback that is more intense than the first level of feedback (such as vibrating the solenoid with a second level of vibration that is stronger than the first level of vibration) to indicate to a user that an input corresponding to execution of a program corresponding to an icon was received.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A force sensing mouse, comprising:
   at least one top portion;
   at least one bottom portion movably connected to the at least one top portion by a multi-directional ball joint;
   cantilever beams each including a strain gauge, a fixed end coupled to the ball joint, and a free end opposite the fixed end wherein each of the cantilever beams are oriented in different directions; and
   pressure elements that each project from the top portion toward one of the cantilever beams;
   wherein:
      a force applied to the at least one top portion causes at least one of the pressure elements to transfer the force from the at least one top portion to at least one of the cantilever beams;
      at least one of the cantilever beams and the respective strain gauge obtains force data from the transferred force; and
      an amount of the force applied to the at least one top portion within a range of force amounts and a direction that the force is applied are determinable from the force data.

2. The force sensing mouse of claim 1, wherein the at least one top portion comprises a touch sensitive surface that detects a location where the force is applied.

3. The force sensing mouse of claim 2, wherein the touch sensitive surface further comprises a capacitive touch sensitive surface.

4. The force sensing mouse of claim 1, wherein the force data comprises strain data.

5. The force sensing mouse of claim 4, wherein the cantilever beams are positioned radially about the ball joint.

6. The force sensing mouse of claim 1, wherein the amount of the force applied to the at least one top portion is determined based at least on force data from each of the cantilever beams and strain gauges.

7. The force sensing mouse of claim 6, wherein a location of the force applied to the at least one top portion is determined at least by comparing the force data from each of the cantilever beams and strain gauges.

8. The force sensing mouse of claim 1, wherein the at least one top portion is rotatable with respect to the at least one bottom portion about the ball joint in multiple different directions.

9. The force sensing mouse of claim 1, further comprising at least one feedback device.

10. The force sensing mouse of claim 9, wherein the feedback device comprises an audio feedback device.

11. The force sensing mouse of claim 9, wherein the feedback device comprises a haptic feedback device.

12. The force sensing mouse of claim 11, wherein the haptic feedback device performs at least one of vibrating the at least one top portion, vibrating the at least one bottom portion, causing an object to strike the at least one top portion, or causing the object to strike the at least one bottom portion.

13. The force sensing mouse of claim 11, wherein the haptic feedback device provides feedback of varying intensity.

14. The force sensing mouse of claim 1, wherein a location of the force applied to the at least one top portion is determined at least based on the force data.

15. The force sensing mouse of claim 1, wherein each of the cantilever beams is positioned perpendicular to two other of the cantilever beams.

16. The force sensing mouse of claim 1, wherein the force sensing mouse transmits the force data to at least one electronic device which determines the amount of the force applied to the at least one top portion from the transmitted force data.

17. The force sensing mouse of claim 1, wherein the cantilever beams are configured in a cross arrangement.

18. The force sensing mouse of claim 1, wherein the force data is scaled based upon a detected location of where the force is applied.

19. A method for operating a force sensing mouse, the method comprising:
   providing a force sensing mouse, comprising:
      at least one bottom portion movably connected to at least one top portion by a multi-directional ball joint;
      cantilever beams each including a strain gauge, a fixed end coupled to the ball joint, and a free end opposite the fixed end wherein each of the cantilever beams are oriented in different directions; and
      projections projecting from the at least one top portion toward one of the cantilever beams;
   obtaining force data utilizing at least one of the cantilever beams and the respective strain gauge wherein a force applied to the at least one top portion causes at least one of the projections to transfer the force to at least one of the cantilever beams and the at least one of the cantilever beams and the respective strain gauge obtains force data from the transferred force; and
   determining an amount of the force applied to the at least one top portion within a range of force amounts and a direction that the force is applied from the force data.

20. A system for interacting with a force sensing mouse, comprising:
   a computing device; and
   at least one force sensing mouse, communicably connected to the computing device, comprising:
      at least one top portion;
      at least one bottom portion movably connected to the at least one top portion by a multi-directional ball joint;
      cantilever beams each including a strain gauge, a fixed end coupled to the ball joint, and a free end opposite the fixed end; and
      elements projecting from the at least one top portion toward one of the cantilever beams;
      wherein:
      a force applied to the at least one top portion causes at least one of the elements to transfer the force to one of the cantilever beams;
      at least one of the cantilever means and the respective strain gauge obtains force data from the transferred force; and
      an amount of the force applied to the at least one top portion within a range of force amounts and a direction that the force is applied are determinable from the force data.

* * * * *